June 16, 1936. A. L. NELSON Re. 20,010

PISTON

Original Filed Aug. 15, 1928 2 Sheets-Sheet 1

Adolph L. Nelson INVENTOR

BY

Frank J. Kent ATTORNEY

June 16, 1936. A. L. NELSON Re. 20,010

PISTON

Original Filed Aug. 15, 1928 2 Sheets-Sheet 2

Adolph L. Nelson INVENTOR

BY

Frank J. Kent ATTORNEY

Reissued June 16, 1936

Re. 20,010

UNITED STATES PATENT OFFICE 20,010

PISTON

Adolph L. Nelson, Detroit, Mich., assignor to Bohn Aluminum & Brass Corporation, Detroit, Mich.

Original No. 1,771,859, dated July 29, 1930, Serial No. 299,719, August 15, 1928. Application for reissue July 26, 1932, Serial No. 624,880

11 Claims. (Cl. 309—13)

This invention relates to pistons, and particularly to pistons for use in automobile engines.

The invention is especially adapted to pistons in which the head and depending piers are formed of light-weight metal, and in which a pair of struts extend across the skirt to exert an influence on the rate of expansion of the bearing faces of the skirt.

A principal object of the invention is to provide a structure in which the intermediate part of each strut is embedded in, and completely surrounded by, the material of a pier.

Another feature of the invention resides in the fact that the middle part of the strut is apertured to provide an upper and a lower branch, each branch being entirely surrounded by pier material.

Further objects and advantages of the invention will become apparent as the description proceeds.

While preferred embodiments have been disclosed for purposes of illustration, it should be understood that various changes may be made in the structure without departing from the spirit and scope of the invention as hereinafter set forth and claimed.

Figure 2:
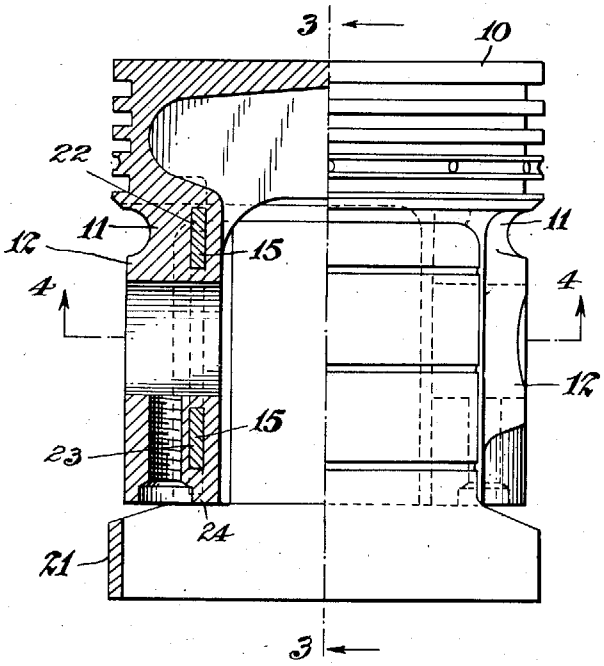
Fig. 2 is a section taken on line 2—2 of Fig. 1.

Referring to the drawings more particularly, the reference numeral 10 indicates the head of the piston, which is preferably formed of a light-weight metal, such as an alloy of aluminum, and numeral 11 is applied to integral piers depending from the head and formed with piston pin bosses 12. The skirt, which may also be formed of light-weight metal, comprises a lower circular portion 13 and cylinder-bearing portions 14 extending upwardly from the circular portion. The cylinder-bearing portions are held in spaced relation by a pair of struts 15 formed of a material less expansible than that of the piers, such as steel.

Figure 4:
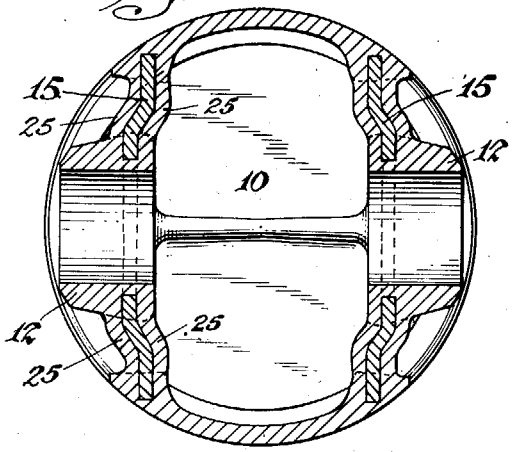
Fig. 4 is a section taken on line 4—4 of Fig. 2.
Figure 5:
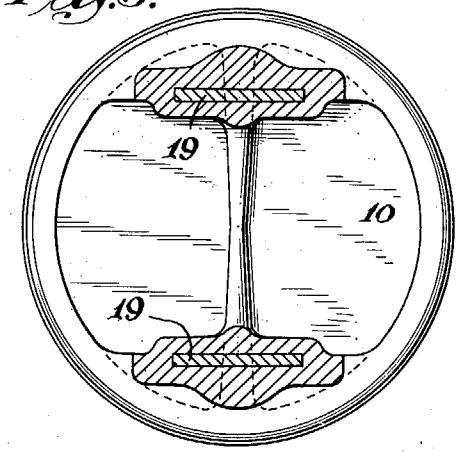
Fig. 5 is a section taken on line 5—5 of Fig. 3.
Figure 3:
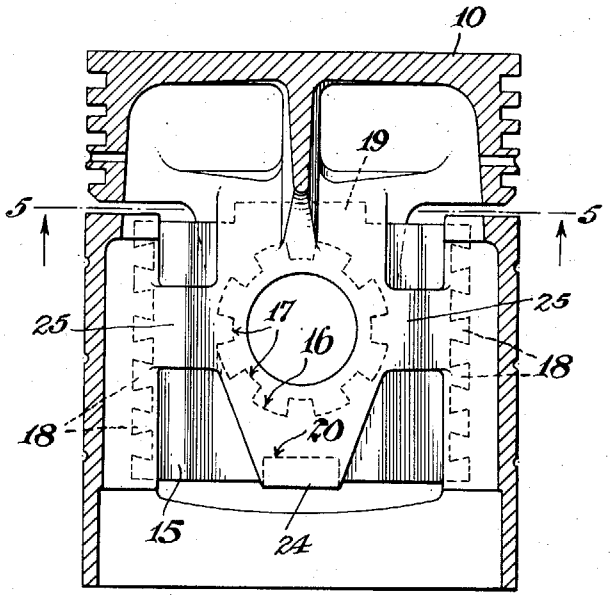
Fig. 3 is a section taken on line 3—3 of Fig. 2.

Each strut is of the shape indicated in Figs. 3 and 4, and formed with an aperture 16 which divides the strut into an upper branch 22 and a lower branch 23. Projections 17 extend into aperture 16. The ends of the strut carry dovetail fingers 18, and a projection 19 rises above the upper edge of the strut at the center, while a recess 20 is formed in the lower edge of the strut.

In forming the piston a pair of struts 15 are positioned in a mold and positively held while the metal forming the head and skirt is cast around them, forming the parts as illustrated. Attention is particularly called to the fact that the material of the pier completely surrounds the middle of the strut as a whole, as well as extending entirely around each of the branches 22 and 23, as shown at 24 in Fig. 2. This construction forms a firm attachment between the strut and pier, since the material of the pier shrinks faster than the material of the strut on cooling and forms a tight, closed grip about the strut. The projections 17 and 19 and the recess 20 also help to firmly anchor the strut in the pier.

In finishing the piston the parts 21 lying under the pin bosses are relieved by grinding them below the normal skirt diameter, or they may be slotted.

Figure 1:
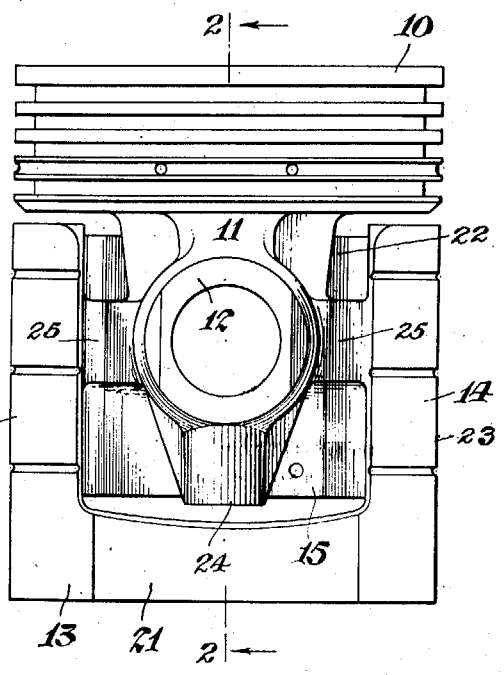
Fig. 1 is a side elevation of an automobile piston.

It may be desirable in some cases to strengthen the connection between the bosses forming the piston pin bearings and the cylinder-bearing portions, and this may be done as shown in Fig. 1 by forming ties 25 which extend between the bosses and the bearing portions and are continuous and homogeneous with the bosses and the bearing portions. In this case each strut is held by four separate complete bands of skirt material, one around branch 22, one around branch 23, one around the upper end of the strut (as viewed in Fig. 4), and one around the lower end of the strut (as viewed in Fig. 4).

I claim:

1. A piston comprising a head, piers depending from the head, piston pin bosses carried by the piers, cylinder-bearing portions on opposite sides of the piston, a pair of struts extending between the cylinder-bearing portions, each strut extending across the piston both above and below the piston pin bosses, the lower edge of each strut being formed with a recess, a continuous band of the material of the pier surrounding the intermediate portion of each strut and passing through the recess.

2. A piston comprising a head, piers depending from the head, piston pin bosses carried by the piers, cylinder-bearing portions on opposite sides of the piston, a pair of struts extending between the cylinder-bearing portions, each strut extending across the piston both above and below the piston pin bosses, the intermediate portion of each strut being completely surrounded by a continuous band of the material of the pier, and a continuous band of homogeneous material extending laterally from each side of each pin boss and completely surrounding part of a strut.

3. A piston comprising a head, piers depending from the head and carrying piston pin bosses, cylinder-bearing portions on opposite sides of the piston, the head, piers and cylinder-bearing portions being formed of light-weight material, a pair of struts extending between the cylinder-bearing portions, the struts being formed of material less expansible than that of the piers, each strut extending across the piston both above and below and outwardly from the piston pin bosses, the intermediate portion of each strut being embedded in a pier and being completely surrounded by a continuous band of the material of the pier, and a continuous band of homogeneous material extending laterally from each pin boss and completely surrounding the portions of the said struts which extend outwardly from said bosses.

4. A piston comprising a head, piers depending from the head, cylinder-bearing portions on opposite sides of the piston, a pair of struts extending between the cylinder-bearing portions, each strut being held by at least three separate, complete bands of the material of the piers.

5. A piston comprising a head, piers depending from the head and carrying piston pin bosses, cylinder-bearing portions on opposite sides of the piston, a pair of struts extending between the cylinder-bearing portions both above and below the openings of the pin bosses, each strut being formed with an aperture for the piston pin, each strut being engaged by at least three separate, complete bands of the material of the piers, said bands passing through the aperture in the strut.

6. A piston comprising a head, piers depending from the head and carrying piston pin bosses, cylinder-bearing portions on opposite sides of the piston, the head, piers and cylinder-bearing portions being formed of light-weight material, a pair of struts of material less expansible than the material of the head extending between the cylinder-bearing portions both above and below the openings of the pin bosses, each strut being formed with an aperture for the piston pin, each strut being engaged by at least three separate, complete bands of the material of the piers, said bands passing through the aperture in the strut.

7. A piston comprising a head, piers depending from the head, cylinder-bearing portions on opposite sides of the piston, a pair of struts of material different from the material of the cylinder-bearing portions, said struts extending between the cylinder-bearing portions, the upper part of each strut being surrounded by a band of the material of the pier, and at least two additional complete bands, each of said additional bands being homogeneous with a pier and with a cylinder-bearing portion and surrounding a part of the strut.

8. A piston comprising a head, piers depending from the head, piston pin bosses carried by the piers, cylinder-bearing portions on opposite sides of the piston, a pair of struts extending between the cylinder-bearing portions, each strut extending across the piston both above and below the piston pin bosses, the lower edge of each strut being formed with a recess, a continuous band of the material of the pier surrounding the intermediate portion of each strut and passing through the recess, and engaging the sides of the recess.

9. A piston comprising a head, piers depending from the head and carrying piston pin bosses, cylinder-bearing portions on opposite sides of the piston, a pair of struts of material different from the material of the piers, each strut extending chordally of the piston from one cylinder-bearing portion to the other both above and below the piston pin bosses, the middle zone of each strut being embedded in a pier and being completely encircled by a continuous band of the material of the pier.

10. A piston comprising a head, piers depending from the head and carrying piston pin bosses, cylinder-bearing portions on opposite sides of the piston, the head, piers and cylinder-bearing portions being formed of light-weight material, a pair of struts extending chordally between the cylinder-bearing portions, the struts being formed of material less expansible than that of the piers, each strut extending across the piston both above and below the piston pin bosses, the part of each strut lying below a pin boss being completely encircled by a continuous band of the material of the pier.

11. A piston comprising a head formed of light-weight material, piers depending from the head and having piston pin bearings formed therein, a skirt comprising cylinder-bearing portions, struts of relatively inexpansible material extending between the cylinder-bearing portions, ties extending laterally on the inside and outside of each strut from the pier to the bearing portions, the ties being homogeneous with the piers and the bearing portions, the bearing portions being connected with each other by members homogeneous with the bearing portions and located below the piston pin bosses.

ADOLPH L. NELSON.